United States Patent [19]
van der Gaag

[11] 3,892,430

[45] July 1, 1975

[54] HINGED PIPE JOINT

[75] Inventor: Cornelis van der Gaag, Delft, Netherlands

[73] Assignee: N.V. Industrieele Handelscombinatie Holland, Rotterdam, Netherlands

[22] Filed: Apr. 22, 1974

[21] Appl. No.: 463,202

[30] Foreign Application Priority Data
Apr. 26, 1973 Netherlands.................. 7305854

[52] U.S. Cl.............................. 285/31; 285/283
[51] Int. Cl............................................ F16l 27/00
[58] Field of Search ......... 285/31, 62, 114, 235, 5, 285/283

[56] References Cited
UNITED STATES PATENTS

| | | | |
|---|---|---|---|
| 2,420,053 | 5/1947 | Muller | 285/114 X |
| 2,822,193 | 2/1958 | Wiethuchter et al. | 285/114 |
| 2,889,993 | 6/1959 | Willetts et al. | 285/5 X |
| 3,154,214 | 10/1964 | Baker | 285/235 X |

*Primary Examiner*—Andrew V. Kundrat
*Attorney, Agent, or Firm*—Young & Thompson

[57] ABSTRACT

A hinged pipe joint for interconnecting rigid pipe sections comprises flexible couplings joined to the rigid pipe sections and having a rigid bend section between them. The flexible and bend sections are housed in an angled casing that has an opening at its angle of a size through which not only the rigid bend section but also both flexible couplings can be removed. The rigid bend and the interior of the casing carry interengagable cheeks that are detachably secured together.

3 Claims, 2 Drawing Figures

HINGED PIPE JOINT

The present invention relates to a hinged pipe joint, in which the ends hinged together of rigid pipes are mutually connected by a flexible portion for the guiding of the medium. Pipe joints of this kind are generally known. The movable portion forms a simple means, with which a connection can be formed in a sealing manner between the rigid pipes, which still permits the freedom of movement of the hinge. However, such a part sometimes has to be replaced, which necessitates disassembly of the hinged joint. With pipe lines with a large diameter this is extremely difficult, particularly when the joint to be disassembled lies under water.

In order to solve this problem, it has been suggested in U.S. Pat. No. 3,845,975 to secure the flexible portion at one end to an attachment flange, said flange in its turn being secured to a casing which is secured to the hinge structure and which is provided with one or more openings sealed by covers, said flange being secured against the inner side of the casing and passing through said opening or openings. The casing acts as a continuation of the pipe joint and, to that end, may be provided with butt-jointed pipe sections, which connect to the attachment flange of the hose.

The object of the present invention is to provide a solution for the same problem which is slightly different and which can be handled more easily in practice.

In accordance with the invention, said object is achieved in that the hose consists of three parts, i.e. two hose couplings which each at one end are secured to the end of a pipe by means of flanges and which each at their other end are secured to an intermediate rigid pipe section by means of flanges, said section being detachably secured in an open casing or frame, said casing or frame being secured to the hinge structure and the opening of which is large enough to permit the pipe section to pass therethrough. When a hose coupling is to be replaced, one needs only remove the pipe section lying between the hose couplings, whereupon the hose couplings detached from the rigid pipe sections can easily be removed and replaced. Preferably, the pipe section disposed in the open casing is secured to the casing or frame with the aid of cheeks provided on said pipe section, said cheeks co-operating with cheeks in the casing or frame.

In accordance with the present invention the solution is also particularly suitable to be used at the region of the centre cardan joint of the conduit, according to U.S. Pat. No. 3,841,357.

The invention will now be described more in detail with reference to the accompanying drawings, wherein.

Figure 1:
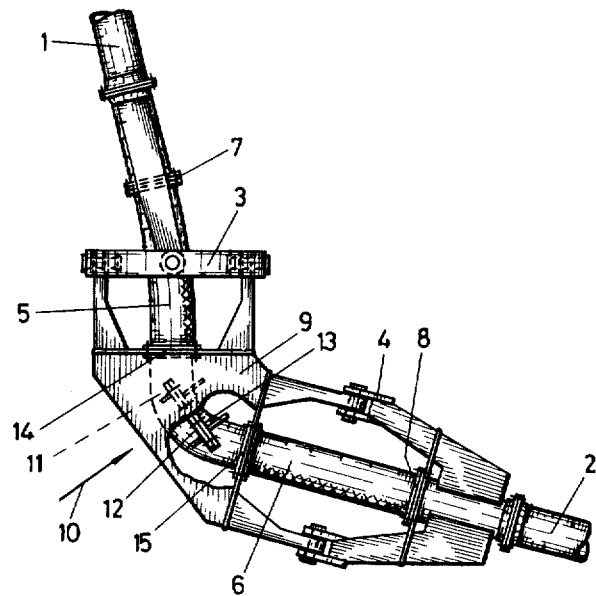
FIG. 1 is a view of the hinged pipe joint according to the invention.

The pipe joint is located between the rigid pipes 1 and 2. These pipes are hinged together by the cardan joint 3 and the joint 4 lying in a vertical plane.

For guiding the medium from pipe 1 to pipe 2 or vice versa, the connection is formed by the hose couplings 5 and 6 which are secured to the pipes 1 and 2 respectively by means of flanges 7 and 8 respectively.

Cardan joint 3 and joint 4 are mutually connected by a frame or casing 9, which, in any case, is entirely open at the side indicated by arrow 10. In this casing 9 a bend 11 is present, which at its ends is provided with flanges for the attachment with the hose couplings 5 and 6 and which bend 11 has cheeks 12 for attachment against inner cheeks or strips 13 in the casing 9. At the region of the flange connections 14 and 15 of the bend 11 with the hose couplings 5 and 6 the casing has openings of a size sufficient to permit the flanges and, therewith, the hoses 5 and 6 to pass therethrough. These openings 16 and 17 have been illustrated in FIG. 2.

Figure 2:
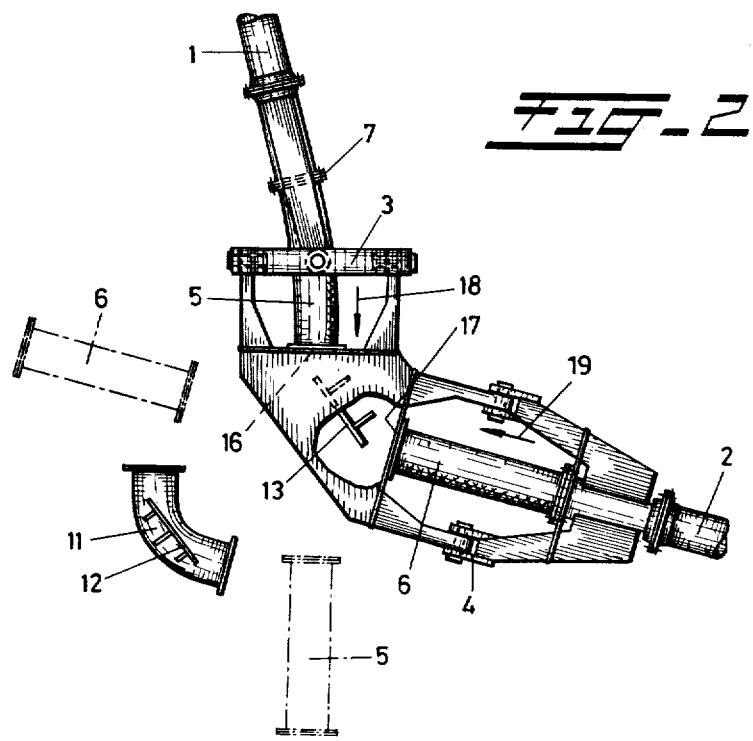
FIG. 2 is the same view in partly disassembled condition.

FIG. 2 illustrates the joint after separation of the bend 11.

It will be evident that the hose 5 can be removed in the direction of arrow 18 and that the hose coupling 6 can be removed in the direction of arrow 19. New hose couplings can be connected in reverse direction and the connection is completed by putting the bend 11 in its place again, and by securing and connecting same with the flanges of the hose couplings 5 and 6.

I claim:

1. A hinged pipe joint between two rigid pipes which extend at an angle with respect to each other, said joint comprising a rigid frame having ends disposed at an angle to each other and disposed between the ends of the two pipes, each pipe being pivotably connected to one of the opposite ends of the frame and pivotably at said connection about an axis perpendicular to and coplanar with the axis of the respective pipe, said frame having cheeks to which detachably are connected the cheeks of a rigid pipe section, a flexible hose connected between each said pipe and the adjacent end of said pipe section, each hose being connected to its pipe and said pipe section by flanges at the ends of the pipes, the hoses and the pipe section, said frame having an opening between its ends and adjacent to said pipe section and shaped and sized such that through said opening the detachment and removal of said pipe section and said hoses can take place.

2. A hinged pipe joint as claimed in claim 1, said frame and pipe section being elbow-shaped and said opening being disposed at the outside of the bend of the elbow.

3. A hinged pipe joint as claimed in claim 1, said frame interconnecting said pipes for universal pivotal movement of said pipes relative to each other.

* * * * *